United States Patent
Chen (10) Patent No.: US 8,331,939 B2
(45) Date of Patent: Dec. 11, 2012

(54) METHOD AND APPARATUS FOR NEIGHBOR CELL CONFIGURATION AND METHOD AND APPARATUS FOR FEMTOCELL BASE STATION CONFIGURATION

(75) Inventor: Xin Chen, Shanghai (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 13/168,278

(22) Filed: Jun. 24, 2011

(65) Prior Publication Data

US 2011/0250890 A1   Oct. 13, 2011

Related U.S. Application Data

(63) Continuation of application No. PCT/CN2009/075675, filed on Dec. 17, 2009.

(30) Foreign Application Priority Data

Dec. 26, 2008   (CN) .......................... 2008 1 0241193

(51) Int. Cl.
*H04W 36/00* (2009.01)
(52) U.S. Cl. ........ 455/436; 455/444; 455/446; 455/449; 370/331
(58) Field of Classification Search .................. 455/436, 455/449, 444, 446; 370/331
See application file for complete search history.

(56) References Cited

U.S. PATENT DOCUMENTS

| | | | | |
|---|---|---|---|---|
| 7,929,970 B1 * | 4/2011 | Gunasekara et al. | ......... | 455/444 |
| 2005/0048974 A1 | 3/2005 | Kim et al. | | |
| 2005/0063316 A1 * | 3/2005 | Giancola et al. | ............... | 370/254 |
| 2005/0255847 A1 * | 11/2005 | Han et al. | ...................... | 455/436 |
| 2005/0288024 A1 * | 12/2005 | Song | .............................. | 455/441 |
| 2007/0097938 A1 * | 5/2007 | Nylander et al. | ............. | 370/338 |
| 2007/0105568 A1 * | 5/2007 | Nylander et al. | ............. | 455/458 |
| 2008/0113670 A1 * | 5/2008 | Dufour et al. | .................. | 455/436 |
| 2008/0233988 A1 * | 9/2008 | Yang et al. | ..................... | 455/515 |
| 2009/0047968 A1 * | 2/2009 | Gunnarsson et al. | ......... | 455/446 |

(Continued)

FOREIGN PATENT DOCUMENTS

CN   1857021 A   11/2006

(Continued)

OTHER PUBLICATIONS

First Chinese Office Action (translation) of Chinese Application No. 200810241193.4; mailed Nov. 20, 2009 (6 pgs.).

(Continued)

*Primary Examiner* — Jinsong Hu
*Assistant Examiner* — Qun Shen
(74) *Attorney, Agent, or Firm* — Finnegan, Henderson, Farabow, Garrett & Dunner, LLP (57) ABSTRACT

The present invention discloses a method and an apparatus for neighbor cell configuration and a method and an apparatus for femtocell base station configuration. The neighbor cell configuration method includes: obtaining information of at least one macro cell; obtaining neighbor cell information of the at least one macro cell; and performing neighbor cell configuration according to the information of the at least one macro cell and the neighbor cell information. With the method and apparatus for neighbor cell configuration and the method and apparatus for femtocell base station configuration, complete femtocell base station neighbor cell information is obtained so that a femtocell base station can be configured automatically. This avoids call drops during handovers and increases the success rate of handovers, and the implementation is easy.

12 Claims, 6 Drawing Sheets

U.S. PATENT DOCUMENTS

| | | | |
|---|---|---|---|
| 2009/0061871 A1* | 3/2009 | Gross et al. | 455/436 |
| 2009/0270106 A1* | 10/2009 | Matsunaga | 455/445 |
| 2010/0232391 A1* | 9/2010 | Olsson et al. | 370/331 |

FOREIGN PATENT DOCUMENTS

| | | |
|---|---|---|
| CN | 1949909 A | 4/2007 |
| CN | 101278581 A | 10/2008 |
| CN | 101448268 A | 6/2009 |
| CN | 101511093 A | 8/2009 |
| WO | WO 2007/040454 A2 | 4/2007 |
| WO | WO 2010/072125 A1 | 7/2010 |

OTHER PUBLICATIONS

Second Chinese Office Action (translation) of Chinese Application No. 200810241193.4; mailed Nov. 29, 2010 (5 pgs.).

Third Chinese Office Action (translation) of Chinese Application No. 200810241193.4; mailed Jun. 2, 2011 (5 pgs.).

Written Opinion of the International Searching Authority relating to Application No. PCT/CN2009/075675; filed Dec. 17, 2009; mailed Mar. 25, 2010 (9 pgs.).

International Search Report relating to Application No. PCT/CN2009/075675; filed Dec. 17, 2009; mailed Mar. 25, 2010 (5 pgs.).

3GPP TSG SA WG5 and RAN WG3 LTE Adhoc; Sophia-Antipolis, France, Jun. 13-14, 2007; R3-071239 (XP-002506178); Agenda Item: 7.2.3 / 7.2.4; Source: Mitsubishi Electric; Title: From large lists of potential neighbor cells to self-optimized neighbor cell lists; Document for: Discussion (4 pgs.).

Extended European Search Report Communication, pursuant to Rule 62 EPC, the supplemental European search report ((7) EPC) and the European search opinion relating to Application No. 09834078.9-2412, (PCT/CN2009075675); mailed Oct. 6, 2011 (10 pgs.).

3GPP TS 25.331 V8.4.0 (Sep. 2008); XP-002659696 (3 pgs.).

* cited by examiner

METHOD AND APPARATUS FOR NEIGHBOR CELL CONFIGURATION AND METHOD AND APPARATUS FOR FEMTOCELL BASE STATION CONFIGURATION

CROSS-REFERENCE TO RELATED APPLICATIONS

This application is a continuation of International Application No. PCT/CN2009/075675, filed on Dec. 17, 2009, which claims priority to Chinese Patent Application No. 200810241193.4, filed on Dec. 26, 2008, both of which are hereby incorporated by reference in their entireties.

FIELD OF THE INVENTION

The present invention relates to the field of communication technologies, and in particular, to a method and an apparatus for neighbor cell configuration and a method and an apparatus for femtocell base station configuration.

BACKGROUND OF THE INVENTION

As 3rd Generation (3G) systems are widely applied, the number of users increases constantly and the traffic volume grows every month. Driven by the rapid growth of services, higher requirements are imposed on the capacity, coverage, and quality of the networks. The current 3G network coverage status shows that the indoor coverage of 3G systems, especially home coverage, is weak.

A femtocell base station is a small-sized, low-power, plug-and-play home base station. Femtocell base stations are designed for personal consumption and are available in large quantities. Therefore, femtocell base stations need to be free of maintenance or require maintenance from operators as little as possible. In terms of access technology, femtocell base stations need to support automatic data configuration, automatic detection and control of interference, automatic clock synchronization, and automatic planning and optimization.

In the automatic planning and optimization of femtocell base stations, automatic neighbor cell planning is a core function. In practice, a femtocell base station detects macro cell information in the environment through a receiver and configures the detected macro cells as its neighbor cells. The correctness of neighbor cell configuration directly determines the handover performance of a network made up of femtocell base stations. Due to the restriction of the installation position of the femtocell base station, the scope of detection is not exactly the same as the scope of coverage. Therefore, it is possible that the femtocell base station fails to detect a macro cell for a handover, thus causing a call drop.

In the conventional femtocell base station receiver based neighbor cell configuration method, parameters are manually configured for each femtocell base station by using a tool.

During the implementation of the foregoing technical solution, however, the inventor finds a certain disadvantage in the technical solution. Because femtocell base stations are in large quantities and their installation positions cannot be controlled in advance, manual parameter configuration for each femtocell base station is hard to implement.

SUMMARY OF THE INVENTION

The present invention provides a method and an apparatus for neighbor cell configuration and a method and an apparatus for femtocell base station configuration so as to obtain complete neighbor cell information and realize automatic configuration of a femtocell base station. This avoids call drops during handovers and increases the success rate of handovers, and the implementation is easy.

One aspect of the present invention provides a neighbor cell configuration method, including:
  obtaining information of at least one macro cell;
  obtaining neighbor cell information of the at least one macro cell; and
  performing neighbor cell configuration according to the information of the at least one macro cell and the neighbor cell information.

Another aspect of the present invention provides a femtocell base station configuration method, including: performing femtocell base station configuration according to the neighbor cells configured according to the foregoing neighbor cell configuration method.

Another aspect of the present invention provides a neighbor cell configuration apparatus, including:
  a cell information obtaining unit, configured to obtain information of at least one macro cell;
  a neighbor cell information obtaining unit, configured to obtain neighbor cell information of the at least one macro cell obtained by the cell information obtaining unit; and
  a configuring unit, configured to perform neighbor cell configuration according to the information of the at least one macro cell obtained by the cell information obtaining unit and the neighbor cell information obtained by the neighbor cell information obtaining unit.

An embodiment of the present invention provides a femtocell base station configuration apparatus, including:
  the foregoing neighbor cell configuration apparatus; and
  a femtocell base station configuring unit, configured to perform femtocell base station configuration according to the neighbor cells configured by the configuring unit or optimizing and configuring unit in the neighbor cell configuration apparatus.

With the method and apparatus for neighbor cell configuration and the method and apparatus for femtocell base station configuration according to the embodiments of the present invention, complete femtocell base station neighbor cell information is obtained so that a femtocell base station is configured automatically. This avoids call drops during handovers and increases the success rate of handovers, and the implementation is easy.

DETAILED DESCRIPTION OF THE EMBODIMENTS

The technical solution of the present invention is hereinafter described in detail with reference to the embodiments and accompanying drawings.

Figure 1:
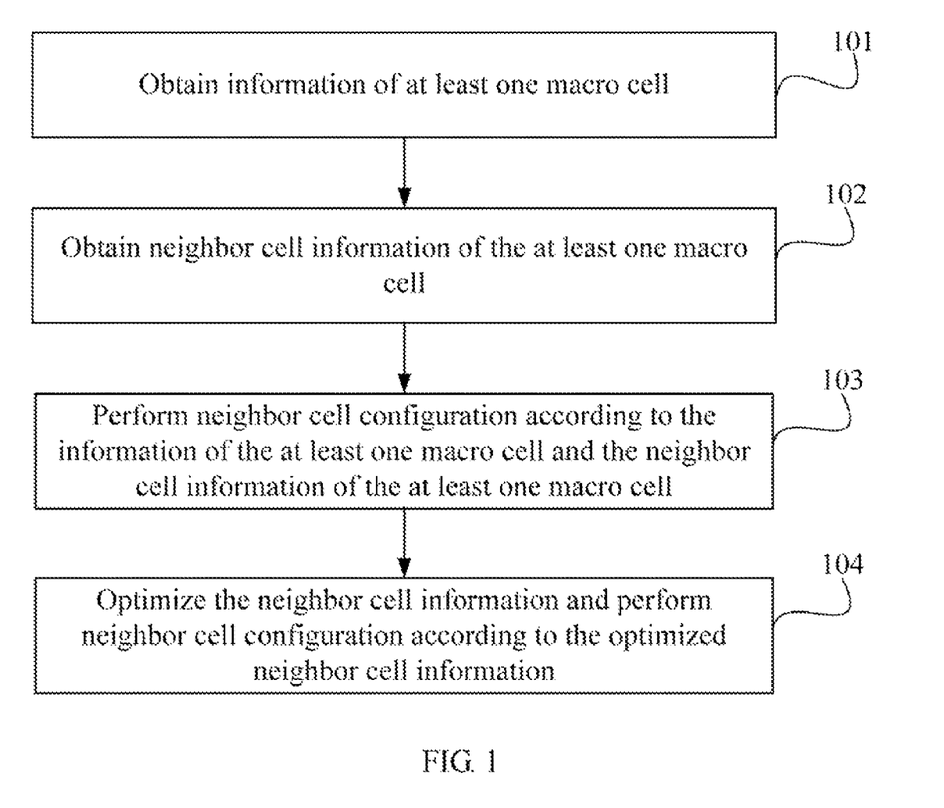
FIG. 1 is a flowchart of a neighbor cell configuration method according to an embodiment of the present invention.

FIG. 1 is a flowchart of a neighbor cell configuration method according to an embodiment of the present invention. The method includes the following steps:

Step 101: Obtain information of at least one macro cell.

A femtocell base station detects radio signals by using a receiver and demodulates the detected radio signals to obtain information of the at least one macro cell.

Step 102: Obtain neighbor cell information of the at least one macro cell.

The neighbor cell information may be obtained by using multiple methods, for example, by parsing system information of the macro cell. Specifically, the femtocell base station parses system information 11 of the macro cell to obtain measurement control system information and then parses intra-frequency measurement system information and inter-frequency measurement system information in the measurement control system information to obtain intra-frequency neighbor cell information and inter-frequency neighbor cell information of the macro cell. The intra-frequency neighbor cell information and inter-frequency neighbor cell information of the macro cell are the neighbor cell information of the macro cell. Or, the neighbor cell information of the macro cell can be obtained by querying the database of a macro cell base station in the macro cell or through neighbor cell selection by a planning tool.

Step 103: Perform neighbor cell configuration according to the information of the at least one macro cell and the neighbor cell information of the macro cell.

The femtocell base station generates a neighbor cell configuration list according to the information of the at least one macro cell and the neighbor cell information of the macro cell and performs neighbor cell configuration according to the neighbor cell configuration list. The generated neighbor cell configuration list can be stored in the femtocell base station.

Step 104: Optimize the neighbor cell information and perform neighbor cell configuration according to the optimized neighbor cell information.

It should be noted that this step is optional. Many neighbor cells of the femtocell base station may be obtained through the foregoing steps 101-103. However, the coverage of the femtocell base station is limited, and neighbor cells that have effects on the femtocell base station are also limited. Therefore, for more reasonable and more accurate neighbor cell configuration, if the number of the obtained neighbor cells of the femtocell base station is above a predetermined threshold, the neighbor cell information can be optimized so that neighbor cells are configured according to the optimized neighbor cell information. The predetermined threshold can be set according to the practical requirements.

The foregoing neighbor cell configuration method can be used to not only configure detected macro cell as neighbor cells of a femtocell base station but also configure the neighbor cells of the detected macro cells as neighbor cells of the femtocell base station. Thus, complete neighbor cell information of the femtocell base station can be obtained and automatic configuration of the femtocell base station can be realized, which can avoid call drops during handovers and increase the success rate of handovers. In addition, automatic configuration of the femtocell base station according to optimized neighbor cell information can effectively improve the handover efficiency. Moreover, the method is easy to implement.

Figure 2:
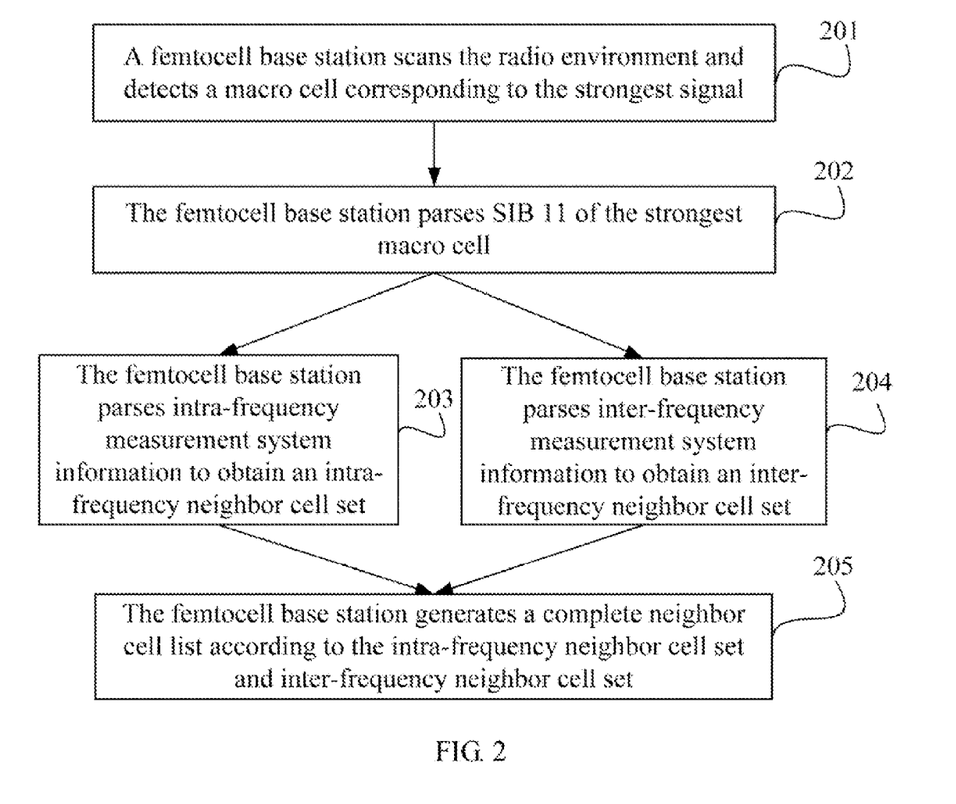
FIG. 2 is a flowchart of a process of obtaining neighbor cell information of a macro cell according to an embodiment of the present invention.

FIG. 2 is a flowchart of a process of obtaining neighbor cell information of a macro cell according to an embodiment of the present invention. The process includes the following steps:

Step 201: A femtocell base station scans the radio environment and detects the macro cell corresponding to the strongest signal.

A femtocell base station has a downlink receiving function and can use a dedicated receiving channel to scan the radio environment. Moreover, because the femtocell base station has a receiving function similar to a mobile phone, the femtocell base station can be switched to a User Equipment (UE) work mode to work like a UE with a same transceiving frequency as that of the UE. The femtocell base station scans the radio environment and detects the strongest macro cell (N_detect) corresponding to the strongest signal.

Step 202: The femtocell base station parses a System Information Block (SIB) 11 of the strongest macro cell.

By parsing the SIB 11 of the strongest macro cell (N_detect), the femtocell base station can obtain measurement control system information.

Step 203: The femtocell base station parses intra-frequency measurement system information in the measurement control system information to obtain an intra-frequency neighbor cell set of the strongest macro cell {Ns_intra_macro}.

Specifically, the femtocell base station parses the intra-frequency measurement system information in the measurement control system information to obtain an intra-frequency cell info list and parses the intra-frequency cell info list to obtain intra-frequency cell ids and the {Ns_intra_macro}. The {Ns_intra_macro} is the intra-frequency neighbor cell set of the detected strongest macro cell.

Step 204: The femtocell base station parses inter-frequency measurement system information in the measurement control system information to obtain an inter-frequency neighbor cell set of the strongest macro cell {Np_inter_macro}.

This step is parallel to step 203. Specifically, the femtocell base station parses the inter-frequency measurement system information in the measurement control system information to obtain an inter-frequency cell info list and parses the inter-frequency cell info list to obtain inter-frequency cell ids and the {Np_inter_macro}. The {Np_inter_macro} is the inter-frequency neighbor cell set of the detected strongest macro cell.

Step 205: The femtocell base station generates a complete neighbor cell list according to the {Ns_intra_macro} and {Np_inter_macro}.

The femtocell base station generates a complete neighbor cell configuration list: {N_femto}={Ns_intra_macro}+{Np_inter_macro}+N_detect.

In the foregoing process of obtaining neighbor cell information, the complete neighbor cell information of a femtocell base station is obtained to get ready for the automatic configuration of the femtocell base station, thus avoiding call drops during handovers and increasing the success rate of handovers.

Figure 3:
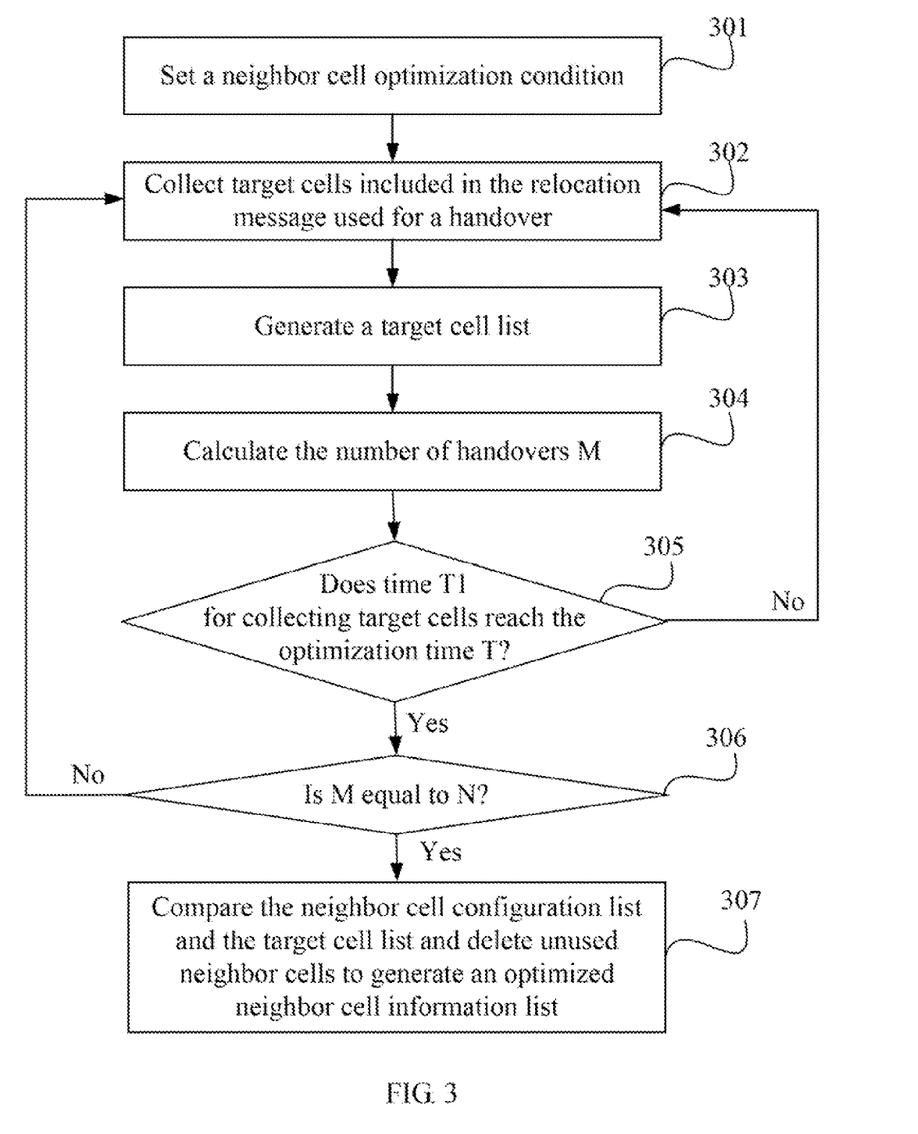
FIG. 3 is a flowchart of a process of obtaining optimized neighbor cell information of a macro cell according to an embodiment of the present invention.

FIG. 3 is a flowchart of a process of optimizing neighbor cell information according to an embodiment of the present invention. The process includes the following steps:

Step 301: Set a neighbor cell optimization condition.

The neighbor cell optimization condition may include different parameters according to different scenarios and requirements, for example, may include an optimization time T and the number of handovers N.

Step 302: Collect target cells included in a relocation message used for a handover.

The relocation message used for the handover includes the target cell determined for each handover and cells used in the handover are recorded in a neighbor cell list.

Step 303: Generate a target cell list.

The femtocell base station collects the measurement reports of UEs and gathers the target cells of handovers within a given time T1 to generate the target cell list.

Step 304: Calculate the number of handovers M.

The femtocell base station calculates the total number of handovers M by adding up the handovers of UEs within the given time T1.

Step 305: Judge whether the time T1 for collecting target cells reaches the optimization time T. If the time T1 for collecting target cells reaches the optimization time T, the process proceeds to step 306; if the time T1 for collecting target cells does not reach the optimization time T the process goes back to step 302.

Step 306: Judge whether M equals to N. If M equals to N, the process proceeds to step 307, if M does not equal to N, the process goes back to step 302.

Step 307: Compare the neighbor cell configuration list and the target cell list and delete unused neighbor cells to generate an optimized neighbor cell information list. Specifically, the femtocell base station deletes the cells which are in the neighbor cell configuration list and are not target cells in the target cell list to generate the optimized neighbor cell list.

In the foregoing process of obtaining optimized neighbor cell information, the femtocell base station deletes neighbor cell information that is not used from the complete neighbor cell information of the femtocell base station, thus greatly optimizing the neighbor cell information. This gets ready for femtocell base station configuration according to the optimized neighbor cell information and effectively increases the handover efficiency.

Figure 4:
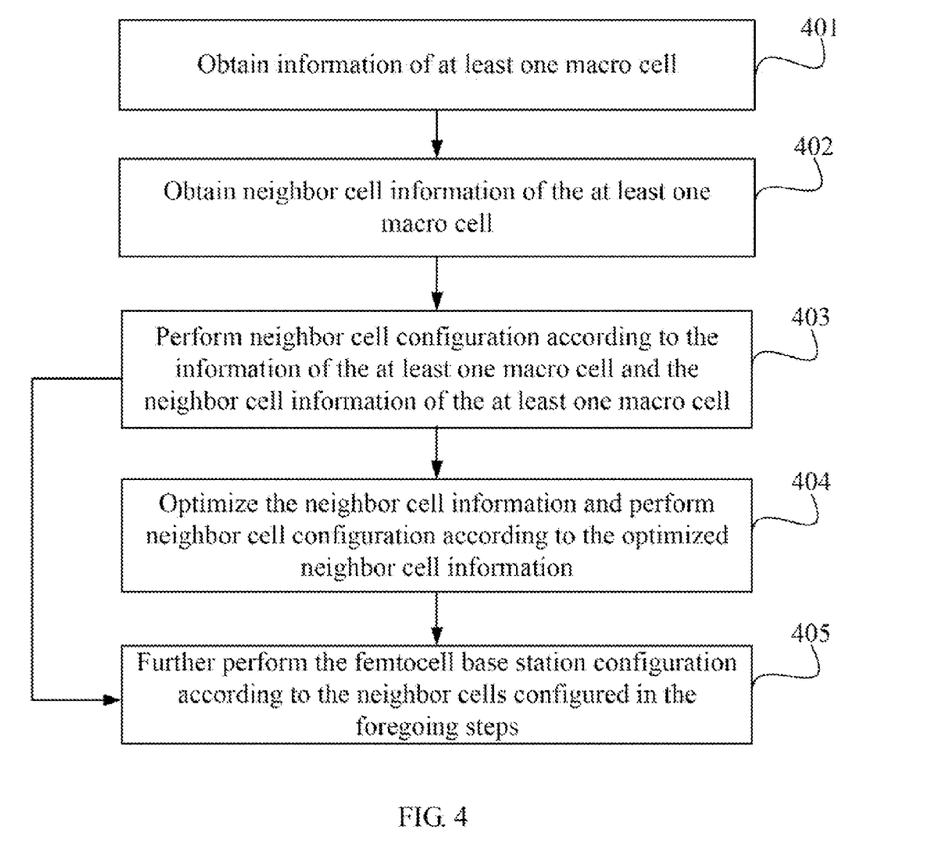
FIG. 4 is a flowchart of a femtocell base station configuration method according to an embodiment of the present invention.

FIG. 4 is a flowchart of a femtocell base station configuration method according to an embodiment of the present invention. The method includes the following steps:

Steps 401-402: Same as steps 101-102 in the neighbor cell configuration method of the present invention, and are not repeatedly described here.

Step 403: Perform neighbor cell configuration according to the information of the at least one macro cell and the neighbor cell information of the macro cell and then the process goes to step 405.

This step is the same as step 103 in the neighbor cell configuration method of the present invention, and is not repeatedly described here.

Step 404: Optimize the neighbor cell information and perform neighbor cell configuration according to the optimized neighbor cell information.

This step is the same as step 104 in the neighbor cell configuration method of the present invention, and is not repeatedly described here.

Step 405: Further perform the femtocell base station configuration according to the configured neighbor cells.

The foregoing femtocell base station configuration method can be used to not only configure the detected macro cells as neighbor cells of the femtocell base station but also configure neighbor cells of the detected macro cells as neighbor cells of the femtocell base station. Thereby, the complete neighbor cell information of the femtocell base station can be obtained and the automatic configuration of the femtocell base station can be realized.

Figure 5:
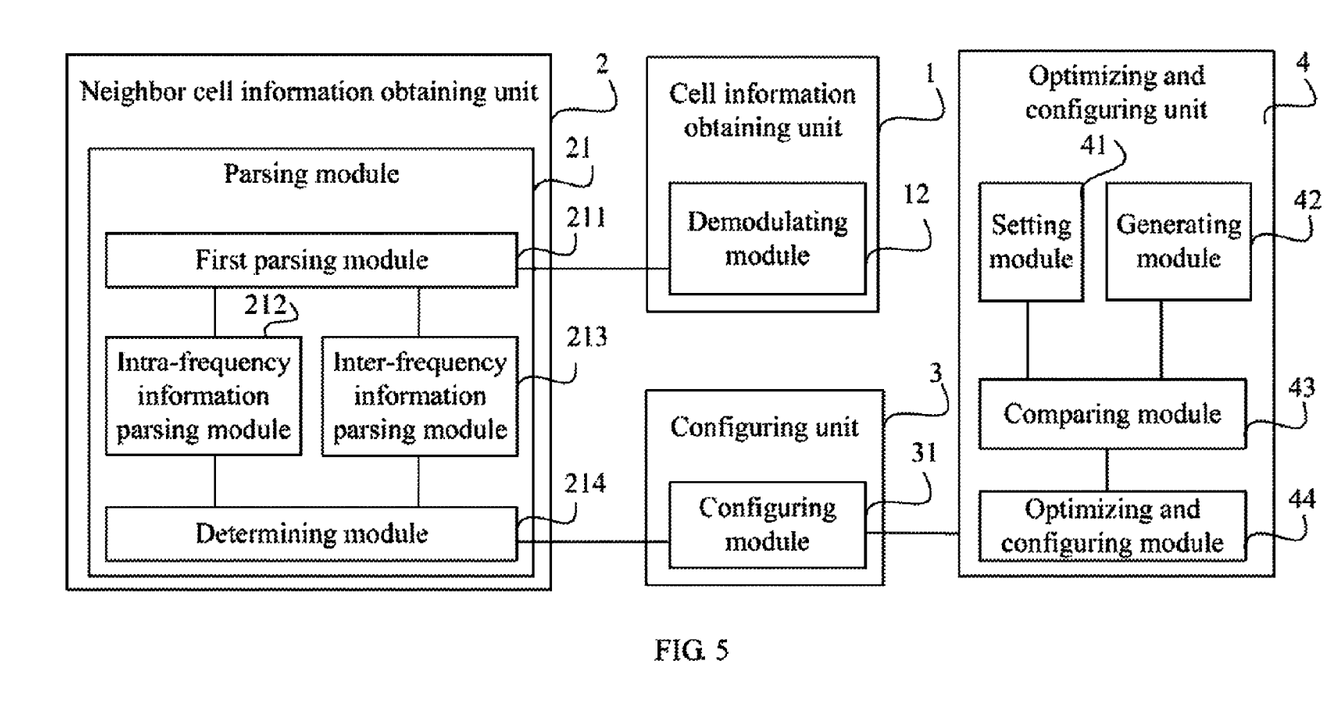
FIG. 5 is a schematic structural diagram of a neighbor cell configuration apparatus according to an embodiment of the present invention.

FIG. 5 is a schematic structural diagram of a neighbor cell configuration apparatus according to an embodiment of the present invention. The apparatus includes: a cell information obtaining unit 1, configured to obtain information of at least one macro cell; a neighbor cell information obtaining unit 2, configured to obtain neighbor cell information of the at least one macro cell obtained by the cell information obtaining unit 1; and a configuring unit 3, configured to perform neighbor cell configuration according to the information of the at least one macro cell obtained by the cell information obtaining unit 1 and the neighbor cell information obtained by the neighbor cell information obtaining unit 2.

To increase the handover efficiency, the neighbor cell configuration apparatus further includes an optimizing and configuring unit 4, configured to optimize the neighbor cell information when the number of neighbor cell information used by the configuring unit 3 to perform neighbor cell configuration is above a predetermined threshold and perform neighbor cell configuration according to the optimized neighbor cell information.

To obtain information of at least one macro cell, the cell information obtaining unit 1 includes a demodulating module 12, configured to detect radio signals by using a receiver and demodulate the detected radio signals to obtain the information of the at least one macro cell. To obtain the neighbor cell information of the macro cell, the neighbor cell information obtaining unit 2 includes: a parsing module 21, configured to parse system information of the macro cell obtained by the cell information obtaining unit 1 to obtain the neighbor cell information of the macro cell; or a querying module, configured to query a database of a macro cell base station in the macro cell to obtain the neighbor cell information of the macro cell; or a selecting module, configured to obtain the neighbor cell information of the macro cell through neighbor cell selection by using a planning tool. The parsing module 21 may further include: a first parsing module 211, configured to parse the system information of the macro cell to obtain measurement control system information; an intra-frequency information parsing module 212, configured to parse intra-frequency measurement system information in the measurement control system information obtained by the first parsing module 211 to obtain intra-frequency neighbor cell information of the macro cell; an inter-frequency information parsing module 213, configured to parse inter-frequency measurement system information in the measurement control system information obtained by the first parsing module 211 to obtain inter-frequency neighbor cell information of the macro cell; and a determining module 214, configured to determine the intra-frequency neighbor cell information of the macro cell and inter-frequency neighbor cell information of the macro cell as the neighbor cell information of the macro cell.

In addition, the configuring unit 3 includes a configuring module 31, configured to generate a neighbor cell configuration list according to the neighbor cell information and perform neighbor cell configuration according to the neighbor cell configuration list.

Further, the optimizing and configuring unit 4 may include: a setting module 41, configured to set a neighbor cell optimization condition; a generating module 42, configured to generate a target cell list; a comparing module 43, configured to compare the neighbor cell configuration list and the target cell list when the parameters obtained according to the information in the target cell list generated by the generating module 42 meets the neighbor cell optimization condition set by the setting module 41 and delete cells which are in the neighbor cell configuration list and are not target cells in the target cell list to generate an optimized neighbor cell list; and an optimizing and configuring module 44, configured to perform neighbor cell configuration according to the optimized neighbor cell list.

The foregoing neighbor cell configuration apparatus may locate inside a femtocell base station.

The foregoing neighbor cell configuration apparatus obtains information of at least one macro cell through a cell information obtaining unit, obtains neighbor cell information of the macro cell through a neighbor cell information obtaining unit, and performs the automatic configuration of the femtocell base station through a configuring unit, thus avoiding call drops during handovers and increasing the success rate of handovers. Further, the optimizing and configuring unit deletes unused neighbor cell information from the complete femtocell base station neighbor cell information, thus greatly optimizing the neighbor cell information and increasing the handover efficiency.

Figure 6:
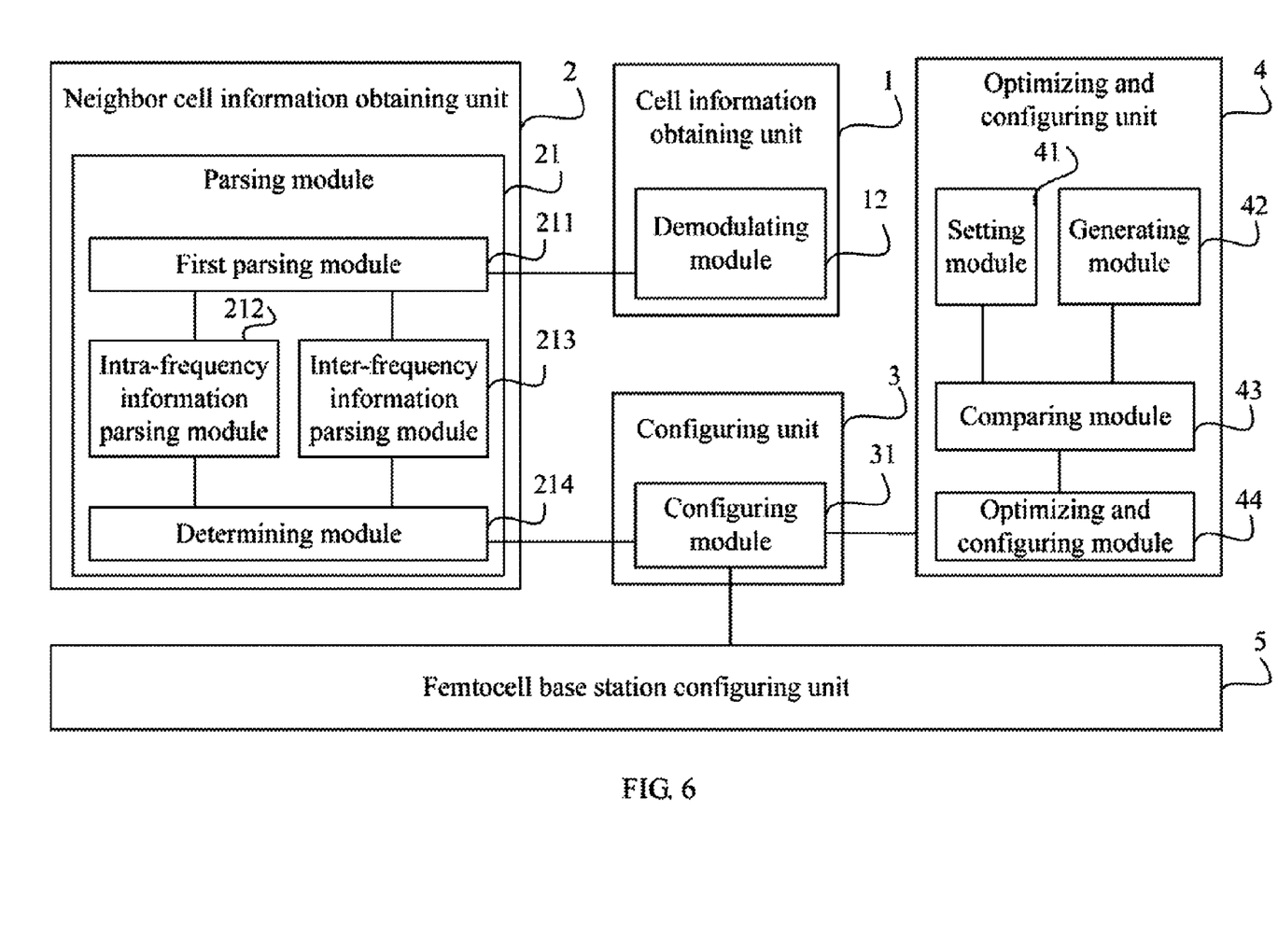
FIG. 6 is a schematic structural diagram of a femtocell base station configuration apparatus according to an embodiment of the present invention.

FIG. 6 is a schematic structure diagram of a femtocell base station configuration apparatus according to an embodiment of the present invention. The femtocell base station configuration apparatus is different from the neighbor cell configuration apparatus in that: the femtocell base station configuration apparatus includes the neighbor cell configuration apparatus and further includes a femtocell base station configuring unit 5, configured to perform the femtocell base station configuration according to the neighbor cell configured by the configuring unit 3 or optimizing and configuring unit 4 in the neighbor cell configuration apparatus.

The femtocell base station configuration apparatus obtains information of at least one macro cell through a cell information obtaining unit, obtains neighbor cell information of the macro cell through a neighbor cell information obtaining unit, and performs neighbor cell configuration according to the information of the macro cell and the neighbor cell information through a configuring unit, and further completes the automatic configuration of the femtocell base station accordingly.

Finally, it should be noted that although the present invention has been described in detail through some exemplary embodiments, the invention is not limited to such embodiments. It is apparent that those of ordinary skill in the art can make various modifications, variations, and replacements to the invention without departing from the spirit and scope of the invention. The invention is intended to cover the modifications, variations, and replacements provided that they fall within the protection scope defined by the claims or their equivalents.

What is claimed is:

1. A neighbor cell configuration method, comprising:
    obtaining, by a femtocell base station, information of at least one macro cell through demodulating radio signals detected by a receiver;
    obtaining, by the femtocell base station, neighbor cell information of the at least one macro cell;
    generating, by the femtocell base station, a neighbor cell configuration list through adding the information of the at least one macro cell and all or part of the neighbor cell information of the at least one macro cell to the neighbor cell configuration list; and
    performing, by the femtocell base station, neighbor cell configuration according to the neighbor cell configuration list;
    optimizing, by the femtocell base station, the neighbor cell configuration list if the number of neighbor cells in the neighbor cell configuration list is above a predetermined threshold; and
    performing, by the femtocell base station, neighbor cell configuration according to the optimized neighbor cell configuration list;
    wherein the optimizing comprises:
    setting a neighbor cell optimization condition, the neighbor cell optimization condition comprising an optimization time T and the number of handovers N;
    generating a target cell list through collecting target cells included in a relocation message used for a handover of a UE in a given time T1; and
    comparing the neighbor cell configuration list and the target cell list and deleting cells which are in the neighbor cell configuration list and are not target cells in the target cell list to generate an optimized neighbor cell configuration list, when the neighbor cell optimization condition is satisfied, which is that the given time T1 for collecting the target cells reaches the optimization time T and the number of handovers M equals to the number of handovers N wherein the number of handovers M is calculated by adding up handovers of UEs within the given time T1.

2. The neighbor cell configuration method of claim 1, wherein the obtaining, by the femtocell base station, the neighbor cell information of the at least one macro cell further comprises:
    parsing, by the femtocell base station, system information of the at least one macro cell to obtain the neighbor cell information of the at least one macro cell; or
    querying, by the femtocell base station, a database of a macro cell base station in the at least one macro cell to obtain the neighbor cell information of the at least one macro cell; or
    performing, by the femtocell base station, neighbor cell selection by using a planning tool to obtain the neighbor cell information of the at least one macro cell.

3. The neighbor cell configuration method of claim 2, wherein the parsing, by the femtocell base station, the system information of the at least one macro cell to obtain the neighbor cell information of the at least one macro cell further comprises:
    parsing the system information of the at least one macro cell to obtain measurement control system information;
    parsing intra-frequency measurement system information in the measurement control system information to obtain intra-frequency neighbor cell information of the at least one macro cell;
    parsing inter-frequency measurement system information in the measurement control system information to obtain inter-frequency neighbor cell information of the at least one macro cell; and
    determining the intra-frequency neighbor cell information of the at least one macro cell and the inter-frequency neighbor cell information of the at least one macro cell as the neighbor cell information of the at least one macro cell.

4. The neighbor cell configuration method of claim 3, wherein the at least one macro cell is one macro cell corresponding to the strongest radio signal which is detected by using a receiver.

5. A neighbor cell configuration apparatus, comprising:
    a cell information obtaining unit, configured to obtain information of at least one macro cell through demodulating radio signals detected by a receiver;
    a neighbor cell information obtaining unit, configured to obtain neighbor cell information of the at least one macro cell obtained by the cell information obtaining unit; and a configuring unit, configured to perform neighbor cell configuration according to a neighbor cell configuration list, which is generated by adding the information of the at least one macro cell obtained by the cell information obtaining unit and all or part of the neighbor cell information obtained by the neighbor cell information obtaining unit to the neighbor cell configuration list;

an optimizing and configuring unit, configured to optimize the neighbor cell configuration list when the number of neighbor cells used for the neighbor cell configuration performed by the configuring unit is above a predetermined threshold and perform neighbor cell configuration according to the optimized neighbor cell configuration list;

wherein the optimizing and configuring unit comprises:
  a setting module, configured to set a neighbor cell optimization condition, the neighbor cell optimization condition comprising an optimization time T and the number of handovers N;
  a generating module, configured to generate a target cell list through collecting target cells included in a relocation message used for a handover of a UE in a given time T1 and to obtain the number of handovers M in the given time T1;
  a comparing module, configured to: compare the neighbor cell configuration list and the target cell list and delete cells which are in the neighbor cell configuration list and are not target cells in the target cell list to generate an optimized neighbor cell configuration list when the neighbor cell optimization condition set by the setting module is satisfied, which is that the given time T1 for collecting target cells reaches the optimization time T and the number of handovers M equals to the number of handovers N, wherein the number of handovers M is calculated by adding up handovers of UEs within the given time T1; and
  an optimizing and configuring module, configured to perform neighbor cell configuration according to the optimized neighbor cell configuration list.

6. The neighbor cell configuration apparatus of claim 5, wherein the neighbor cell information obtaining unit comprises:
  a parsing module, configured to parse system information of the at least one macro cell obtained by the cell information obtaining unit to obtain the neighbor cell information of the at least one macro cell; or
  a querying module, configured to query a database of a macro cell base station in the at least one macro cell to obtain the neighbor cell information of the at least one macro cell; or
  a selecting module, configured to perform neighbor cell selection by using a planning tool to obtain the neighbor cell information of the at least one macro cell.

7. The neighbor cell configuration apparatus of claim 6, wherein the parsing module comprises:
  a first parsing module, configured to parse the system information of the at least one macro cell to obtain measurement control system information;
  an intra-frequency information parsing module, configured to parse intra-frequency measurement system information in the measurement control system information obtained by the first parsing module to obtain intra-frequency neighbor cell information of the at least one macro cell;
  an inter-frequency information parsing module, configured to parse inter-frequency measurement system information in the measurement control system information obtained by the first parsing module to obtain inter-frequency neighbor cell information of the at least one macro cell; and
  a determining module, configured to determine the intra-frequency neighbor cell information of the at least one macro cell and the inter-frequency neighbor cell information of the at least one macro cell as the neighbor cell information of the at least one macro cell.

8. The neighbor cell configuration apparatus of claim 7, wherein the at least one macro cell is one macro cell corresponding to the strongest radio signal which is detected by a receiver.

9. A femtocell base station, comprising:
  a neighbor cell configuration apparatus, wherein the neighbor cell configuration apparatus comprises:
    a cell information obtaining unit, configured to obtain information of at least one macro cell through demodulating radio signals detected by a receiver;
    a neighbor cell information obtaining unit, configured to obtain neighbor cell information of the at least one macro cell obtained by the cell information obtaining unit; and
    a configuring unit, configured to perform neighbor cell configuration according to a neighbor cell configuration list, which is generated by adding the information of the at least one macro cell obtained by the cell information obtaining unit and all or part of the neighbor cell information obtained by the neighbor cell information obtaining unit to the neighbor cell configuration list;
    an optimizing and configuring unit, configured to optimize the neighbor cell configuration list when the number of neighbor cells used for the neighbor cell configuration performed by the configuring unit is above a predetermined threshold and perform neighbor cell configuration according to the optimized neighbor cell configuration list;
    wherein the optimizing and configuring unit comprises:
      a setting module, configured to set a neighbor cell optimization condition, the neighbor cell optimization condition comprising an optimization time T and the number of handovers N;
      a generating module, configured to generate a target cell list through collecting target cells included in a relocation message used for a handover of a UE in a given time T1 and to obtain the number of handovers M in the given time T1;
      a comparing module, configured to: compare the neighbor cell configuration list and the target cell list and delete cells which are in the neighbor cell configuration list and are not target cells in the target cell list to generate an optimized neighbor cell configuration list when the neighbor cell optimization condition set by the setting module is satisfied, which is that the given time T1 for collecting target cells reaches the optimization time T and the number of handovers M equals to the number of handovers N, wherein the number of handovers M is calculated by adding up handovers of UEs within the given time T1; and
      an optimizing and configuring module, configured to perform neighbor cell configuration according to the optimized neighbor cell configuration list.

10. The femtocell base station of claim 9, wherein the neighbor cell information obtaining unit comprises:
  a parsing module, configured to parse system information of the at least one macro cell obtained by the cell information obtaining unit to obtain the neighbor cell information of the at least one macro cell; or a querying module, configured to query a database of a macro cell base station in the at least one macro cell to obtain the neighbor cell information of the at least one macro cell; or a selecting module, configured to perform neighbor cell selection by using a planning tool to obtain the neighbor cell information of at least one macro cell.

11. A neighbor cell configuration method, comprising:

setting, by a femtocell base station, a neighbor cell optimization condition, the neighbor cell optimization condition comprising an optimization time T and the number of handovers N;

generating, by the femtocell base station, a target cell list through collecting target cells included in a relocation message used for a handover of a UE in a given time T1;

when the neighbor cell optimization condition is satisfied, comparing, by the femtocell base station, a neighbor cell configuration list and the target cell list and deleting, by the femtocell base station, cells which are in the neighbor cell configuration list and are not target cells in the target cell list to generate an optimized neighbor cell configuration list, wherein the neighbor cell optimization condition is satisfied when: the given time T1 for collecting target cells reaches the optimization time T and the number of handovers M equals to the number of handovers N, wherein the number of handovers M is calculated by adding up handovers of UEs within the given time T1 and wherein the neighbor cell configuration list is generated according to information of at least one macro cell and neighbor cell information of the at least one macro cell, wherein the information of at least one macro cell is obtained through demodulating radio signals detected by a receiver and the neighbor cell information of the at least one macro cell is obtained through parsing system information of the at least one macro cell; and performing, by the femtocell base station, neighbor cell configuration according to the optimized neighbor cell configuration list.

12. The neighbor cell configuration method of claim 11, wherein the at least one macro cell is the one macro cell corresponding to the strongest radio signal which is detected by using a receiver.

* * * * *